United States Patent
Zhang

(10) Patent No.: US 10,382,379 B1
(45) Date of Patent: Aug. 13, 2019

(54) INTELLIGENT MESSAGING ASSISTANT BASED ON CONTENT UNDERSTANDING AND RELEVANCE

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 293 days.

(21) Appl. No.: 15/182,598

(22) Filed: Jun. 15, 2016

Related U.S. Application Data

(60) Provisional application No. 62/175,457, filed on Jun. 15, 2015, provisional application No. 62/217,873, filed on Sep. 12, 2015.

(51) Int. Cl.
H04L 12/58 (2006.01)
G06F 17/27 (2006.01)
G06F 16/2457 (2019.01)

(52) U.S. Cl.
CPC ........ H04L 51/28 (2013.01); G06F 16/24578 (2019.01); G06F 17/2705 (2013.01)

(58) Field of Classification Search
CPC . H04L 51/28; G06F 17/2705; G06F 17/30553
See application file for complete search history.

(56) References Cited

U.S. PATENT DOCUMENTS

| 8,301,704 | B2 | 10/2012 | Gross | |
|---|---|---|---|---|
| 8,762,462 | B1 | 6/2014 | Duddu et al. | |
| 2009/0234876 | A1 | 9/2009 | Schigel et al. | |
| 2010/0017194 | A1* | 1/2010 | Hammer | G06F 17/2785 704/9 |
| 2010/0306185 | A1* | 12/2010 | Smith | G06O 10/107 707/709 |
| 2011/0252061 | A1* | 10/2011 | Marks | G06F 17/30864 707/771 |
| 2013/0117383 | A1* | 5/2013 | Hymel | G06Q 10/107 709/206 |
| 2014/0156743 | A1 | 6/2014 | Veda et al. | |

* cited by examiner

Primary Examiner — Viet D Vu

(57) ABSTRACT

System and methods for assisting a user to communicate a message to a recipient without requiring the user to provide a communication address of the recipient, especially when the address of a candidate recipient is unknown to the user, or the user has never communicated with the receiving party before, such as for sending a message to a company or store regarding a product/service, or sending an opinion/comment to a government agency or legislature, or to a social media site, etc. The methods are based on understanding the key information in an input content, such as a textual/audio/video message or an image, and detects objects, topics or domains of the input content; determining a relevance measure between the content in the message and a communication address of a potential recipient, and making an address suggestion or automatically send the message to the recipient, without requiring the user to spend much time and efforts in searching for the communication addresses of an intended recipient or learning how to use related communication tools.

18 Claims, 9 Drawing Sheets

INTELLIGENT MESSAGING ASSISTANT BASED ON CONTENT UNDERSTANDING AND RELEVANCE

CROSS REFERENCES TO RELATED APPLICATIONS

The present application claims priority to U.S. Provisional Patent Application 62/175,457 entitled "System and Methods for Facilitating Communications Based on Content Recognition and Relevance" filed on Jun. 15, 2015, and U.S. Provisional Patent Application 62/217,873 entitled "System and Methods for Content Classification with Associative and Augmented Data Representation" filed on Sep. 12, 2015, the disclosures of which are incorporated herein by reference.

BACKGROUND

In conventional electronic communications, such as using emails or chats, a user usually knows the address of the intended recipient, and can send messages to the intended recipient using whatever appropriate software tools, such as email applications.

However, there are often cases when a user wants to communicate to a party whose address is unknown to the user. For example, if a user wants to send a message to a company or store from which the user has bought a product, or to the president of the country for an opinion on a policy, the electronic communication address, such as the email address, of the intended recipient, is often unknown at the time the user wants to send a message to.

Furthermore, various social media sites, such as the currently popular FaceBook, Twitter, Pinterest, etc., require a user to maintain separate user accounts, and a user may also needs to spend time and effort in learning how to use each site in order to publish a comment or picture.

Meanwhile, people often have various ideas, thoughts, comments, feedback, and opinions they would like to communicate to or be heard by intended parties. However, people often do not know the right address or even who is the right person to send the message to if the intended recipient is not a personal or business associate whose communications address is known. Therefore, in such cases, most people end up with not bothering to say anything unless the message is of critical importance; or, by the time they have found the intended recipient, discovered the correct address, and determined the best communication tool, the ideas or thoughts may have disappeared, or the urgency has faded.

For example, suppose a person has purchased a product from a store, and wants to send feedback or a complaint about the product, the person will need to first decide whether the comment should be sent to the store or to the manufacturer of the product, then to find out what address, such as an email address or a web address, to use to send the message.

As another example, suppose a person wants to voice an opinion on a certain political issue. She may open a social network account, such as a Twitter account, and write tweets on the topic, hoping her voice can be heard by someone important or someone the message is intended to. Alternatively, she may need to spend time and effort to find an email address of a government or legislature branch, such as the White House, or Congress.

However, efforts like those mentioned in the examples above often do not succeed, as communicating to an entity like a government agency or a company is not like talking to one's friends or relatives or colleagues. An ordinary person usually does not know the means to communicate to an entity that is not an acquaintance, or does not have the correct communication address on file for public entities like a company or a government agency. Finding such information is often not an enjoyable thing to do, and a person will easily give up such efforts.

However, the need to effectively voice one's opinion to a public entity, or to make a comment or feedback on certain issues or on certain products or services often exists. A means to facilitate these types of communications can contribute to the social good as a whole.

Furthermore, even when communicating with someone that a person knows, one problem in the current information age is that finding a communication address for a particular party among a long list of addresses, such as email addresses, can still be a time consuming task, and can lead to mistakes.

SUMMARY OF THE INVENTION

The present invention provides system and methods for a person to effectively communicate with either an acquaintance or someone the person does not know.

Specifically, the system and methods of the present invention automatically detects the key information in an input content, such as a textual/audio/video message or an image, and detects objects, topics or domains of the input content, gathers the communication addresses of various entities, determines a relevance between the topic or domain and an entity or its communication address or addresses, and selects the address that is the most relevant to the topics or domains associated with the input content, and sends the message content to the correct address, without requiring the user to spend much time and effort in searching for the communication addresses of the intended recipient and learning how to use related communication tools.

The system and methods of the present invention can be applied to a number of use cases. In one embodiment, the system and methods of present invention perform an analysis of the message content, and gather the most relevant communication addresses of entities that are not known to the user for the specific content, and display address suggestions for the user to select.

In another embodiment, when the user wants to send to message to someone, the system and methods of present invention perform an analysis of the message content, and select communication addresses from the user's contact list or address book, and display address suggestions based on the topics or domains associated with the message content, without requiring the user to select an address from a long list of addresses.

In yet another embodiment, when the user is reading a content including a document or a webpage, and wants to share the content with someone, the system and methods of present invention select communication addresses from the user's contact list or address book, and display address suggestions based on the topics or domains associated with the content, without requiring the user to select an address from a long list of addresses.

Various other embodiments of the present invention are also disclosed. The examples used for illustrating the invention are mainly with text content and for certain use cases such as the ones in this summary, but the system and methods of the present invention can be applied in various other embodiments.

BRIEF DESCRIPTION OF FIGURES

The following drawings, which are incorporated in and form a part of the specification, illustrate embodiments of the present invention and, together with the description, serve to explain the principles of the invention.

DETAILED DESCRIPTION OF THE INVENTION

In the following description, the term "data source" and "knowledge source", "database", or "knowledge base", may be interchangeably used, whenever contextually appropriate.

A user's collection of addresses is defined as a dataset containing addresses or contact information that is entered by the user or entered with the user's permission, or containing the addresses or entities that the user has previously communicated with. The commonly known objects such as an address book or a contact list are examples of a user's collection of addresses. In some embodiments, the entity or address being identified or suggested using the present methods are specifically those that are not in the user's collection of addresses, or they are unknown to the user at the time of content processing. Thus, the present methods provide the unique advantage and utility of assisting the user to communicate certain contents to appropriate recipients that the user would otherwise not be able to or must make much effort to do so. In such cases, the entity or address being identified or suggested using the present methods are obtained or received from a source other than the user's collection of addresses, as they do not exist in the user's collection of addresses.

Figure 1:
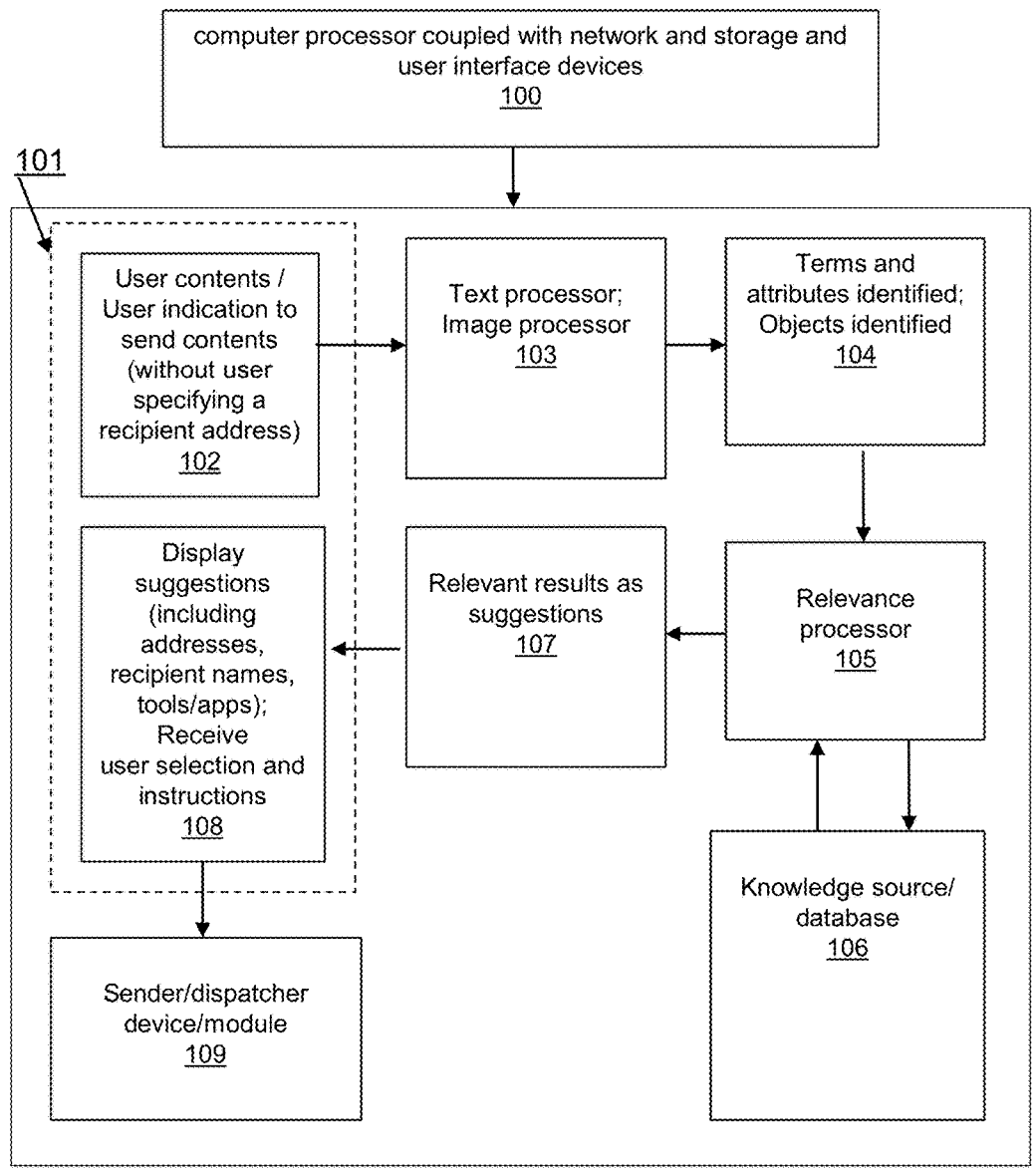
FIG. 1 is an illustration of a system and its components where the present invention can be implemented, together with the major steps in implementing the present invention.

FIG. 1 is an illustration of a system and its components where the present invention can be implemented with different embodiments.

In FIG. 1, one or more computer processors (100) are coupled with network and storage and user interface devices. The computer processors are further coupled with functional hardware or software modules (101-109).

User contents (102), such as a message being composed, or a webpage or document being viewed by a user, or an image object, or an audio/video object, is displayed in a user interface (101). The user interface can also accept a user indication to send the user content to someone or somewhere, without also receiving a recipient address from the user to send the input content to. When the user indication is received by the computer processor, or in some embodiments before any user indication is received, depending on whether the user content is in a text form or an image format, the user content is transmitted to the content processor module (103), which can include either a text processor or an image processor. In the case of a text content, the text processor analyzes the text part in the user content, and identifies the terms, such as word or phrases, in the content. The text processor can also identify various types of attributes associated with the terms, such as the grammatical attributes, semantic attributes, contextual attribute, etc. (104). Details about the methods for identifying such attributes are disclosed in a number of patents and patent applications filed by the present inventor. They include U.S. Pat. No. 8,370,129 entitled "System And Methods For Quantitative Assessment Of Information In Natural Language Contents", U.S. Pat. No. 8,407,217 entitled "Automated Topic Discovery In Documents", U.S. Pat. No. 9,047,283 entitled "Automated Topic Discovery In Documents And Content Categorization", U.S. Pat. No. 8,843,476 entitled "System And Methods For Automated Document Topic Discovery, Browsable Search And Document Categorization", U.S. Pat. No. 9,367,608 entitled "System, Methods, And User Interface For Searching Objects And Providing Answers To Queries Using Association Data", and U.S. patent application Ser. No. 13/732,374 entitled "System And Methods For Quantitative Assessment Of Information In Natural Language Contents And For Determining Relevance Using Association Data" filed on Jan. 1, 2013, and U.S. Provisional Patent Application 62/217,873 entitled "System and Methods for Content Classification with Associative and Augmented Data Representation" filed on Sep. 12, 2015. The disclosures of which are incorporated herein by reference.

In the case of an image content, the image processor analyzes the content of the image, recognizes objects in the image, such as a person or a building or other objects, and possible attributes associated with the objects in the image, such as the light intensity, contrast, color, shape, size, position on the image or relative position to other objects, relative distance, and repetition patterns, etc.

Then, the result in (104) is received by a relevance or relationship processor module (105) where the relevance or relationship between the text content and a potential entity or its address is determined.

The processor (105) utilizes knowledge source or other types of databases (106) stored in the local or remote storage device for calculating a relevance/relationship measure between the text content and a potential entity for communication or its communication address, and uses the methods in the present disclosure and referenced disclosures for analyzing attributes associated with terms in the text content and attributes associated with various entities and their communication addresses.

In a general sense, the relevance or relationship can cover aspects other than the communication address of an entity. For example, in addition to determining a relevance or relation between a text content and an entity itself, which includes a person or an organization, or a product or service, or other types of objects, a relevance or relation can be determined also based on an aspect of the entity, such as an attribute associated with a person or organization, or a feature or function associated with a product or service, etc.

When one or more relevant entities or their communication addresses are found, the entity names or the addresses are retrieved from the knowledge source as relevant candidates for making suggestions (107), and can be displayed or provided in the user interface as suggestions, from which the user can select one or more addresses to send the user content to (108), or the information about such candidates can be output for use elsewhere.

Once the user indication to send the content to the selected address is received, the content or a form of its representation, such as a link to the content, or the content itself, can be sent by a sending agent or device (109), to the address that is selected by the user. In some embodiments, especially when the relevance measure is high enough, the system can automatically send the content to an address, without displaying the address to the user, or without requiring the user to make a selection.

In some embodiments, one or more communication applications or tools are also displayed for user to select, or automatically selected for the user. For example, once an address is determined, the communication tool that is often used or recently used for that address can be selected as a suggestion, or ranked higher in a list of applications or tools. In some other embodiments, a relevance measure between the communication tool itself and the object in the input content, such as a term representing a topic in the text content or an object in an image content, is also determined in addition to the relevance measure between the topic and the address, and the relevant communication tool itself can be displayed as a suggestion for sending the content, or can be ranked higher among a set of suggested communication tools or applications, such as one or more email applications with one or more specific email service providers, or one or more messaging applications on a mobile phone, etc.

In the following with more detailed descriptions, examples for illustrating the invention mainly relate to text contents that contain words or phrases. The same principle can also be applied to other types of contents, such as image contents, or audio/video contents.

Determining a Relevance Measure Between a Content and an Entity:

When the input content (102) contains text elements, such as a term, which can include a word or a phrase or a sentence or a paragraph, etc., various attributes of a term can be identified. Some terms are names representing different types of objects or properties or attributes associated with the objects. In the present disclosure, an object is a general term that includes various types of objects, object classes, or sub-classes, or an instance. It can be or can refer to a physical object, such as a book, a computer, a person; or a conceptual object, such as a number, a concept, a topic, etc.

For the purpose of facilitating communications to an entity, whether or not such an entity is known to the user, or whether the user's collection of addresses contains the address of the entity, in a tool or user interface based on the present invention, a term that matches an entity name can be used to determine or produce a relevance measure between the object in the input content, and the entity, or the entity's communication address. Furthermore, a term that matches an attribute or attribute value associated with an entity can also be used for determining or producing a relevance measure between the object in the input content or the input content itself and the entity or the entity's communication address.

On the other hand, in the knowledge source (106), the knowledge data about an entity can be stored in different formats. It can be a textual description about the entity such as the entity name or its attributes; or one or more database tables or records for the entity and its related information; or a knowledge dataset storing associations, or a knowledge graph storing specific relationships between the entity and various other objects.

For example, in a knowledge source, a textual description for a printer manufacturer can include the name of the manufacturer, or names of its products or service types or product features, its communication addresses, as well as other attributes such as its location, number of employees, management team, etc.

Information in a relational or non-relational database for the same printer manufacturer can contain one or more data tables or key-value pairs, and each can store a certain type of relevant information, including the entity's financial data, management data, communication address, and types of products or services, etc.

Figure 2:
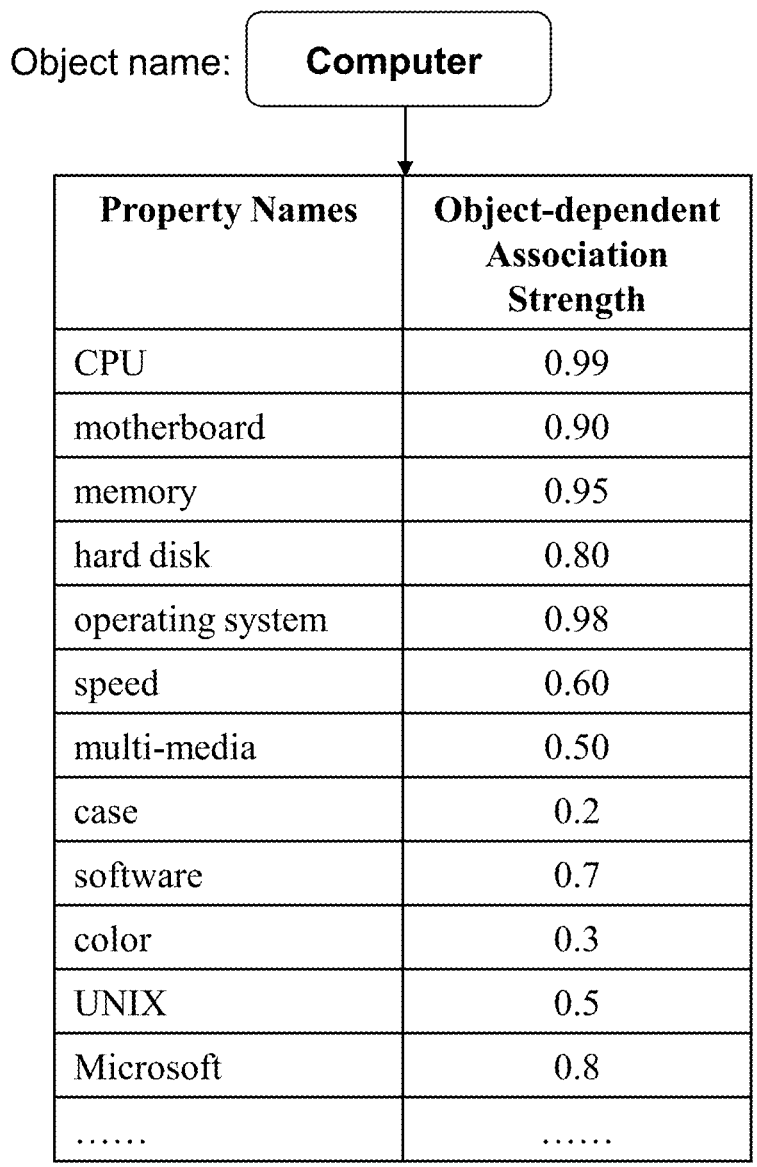
FIG. 2 is an illustration of an association dataset for the object of "computer" in the form of a table containing both the terms and their association strength values.

A knowledge dataset, such as the ones disclosed in the referenced disclosure listed above by the present inventor, can be in the form of an object-properties association dataset, with a term representing the object name, and a plurality of terms representing the properties or attributes associated with the object. Each property can further have a corresponding value indicating the strength of the association between the term representing a property or attribute and the term representing the object itself. FIG. 2 is an illustration of an association dataset for the object of "computer" in the form of a table containing both the terms and their association strength values. Other forms of the object-properties association dataset are also disclosed in the above mentioned patents by the present inventor and are incorporated herein by reference.

A special type of knowledge dataset is known as Word Vector, which is a distributed representation of implicit relations among various terms in a training dataset.

A knowledge graph can be a form of knowledge representation that stores the specific relationships between the object and other objects by nodes and arcs, and relation descriptions of the nodes and arcs.

The various types of knowledge data can all be used for determining a relevance measure or a relationship between an input content and an entity or its communication address, using specific methods that are described in the present disclosure and in the referenced disclosures listed above In one embodiment, the knowledge data include names and descriptions of various entities such as a company or organization or an individual, and also information about various attributes or properties associated with the entity, such as what type of business the entity is engaged in, what type of activities or functions the entity is performing, etc. Furthermore, the knowledge data also include the communication addresses associated with the entities, as well specific or additional information about the addresses, such as annotations, descriptions, and labels, indicating the general or specific purposes that an address is intended for.

For example, if the entity is a government, such as the US government, information about its public email addresses or postal addresses or phone or fax numbers are collected and stored in the knowledge source. Furthermore, descriptions or labels associated with each address are also stored, such as an annotation for an email address that is for citizens of the United States to send inquires about healthcare policy, etc. Furthermore, information about attributes or properties associated with the US government, such as its various branches and their corresponding functions, people holding various office positions and their duties, etc., are also stored in the knowledge data source.

If the entity is a retailer, information about its email addresses or postal addresses or phone or fax numbers are collected and stored. Furthermore, descriptions or labels associated with each address are also stored, such as an annotation for an email address that is for customers to send inquires about their products, or store locations, or store hours, etc. Furthermore, information about attributes or properties associated with the business, such as its brands, various products or services or locations or management teams, etc., are also stored in the knowledge data source.

As mentioned above, entities can be of various types or any type, not limited to the government or retail stores as in the above examples.

The system of the present invention receives an input content associated with a user, such as a message or document that the user is composing, a document or webpage the user is reading, an image or video the user is viewing, or an audio clip the user is listening to.

Some of the user's content contains text, or text strings. A text string comprises one or more terms, each term comprises one or more words or phrases. In some embodiments, a term can also comprise one or more sentences or paragraphs.

When the content contains text, a text processor or processing module like the one in (103) is activated. The text content is first tokenized into tokens, which are individual words or phrases, which are also instances of various terms (104). For ease of reference, in the following description, a specific term may be called as a "first term" in the text string, to distinguish it from other terms in the same string.

In some embodiments, when the first term is identified in the input content, the first term is matched against entries in the knowledge source or database.

In some embodiment, the first term may match the name of an entity, while the entity can be a company or an organization, or an individual. In such a case, the communication address associated with the entity can be retrieved from the database, especially when the level of ambiguity caused by possible multiple matches is low, such as when there is only one match.

For example, in a text editor or a communication tool, the user may write some text such as "I bought a shirt from Macy's, but it is kind of discolored, and I don't like it", The term "Macy's" in the input content can be matched with a term in the name or description of the entity named Macy's, and one or more email addresses associated with Macy's can be retrieved from the data source, and output to be displayed to the user as a suggestion to send the text content to.

In some embodiments, the entity name can first be displayed, then, its associated communication addresses can also be displayed for the user to select or confirm, and the content can be sent to the selected address.

In some embodiments, when an input content is received by the system, the system can determine whether to suggest a communication address by identifying terms that indicate a user's intention to communicate.

For example, in the above example, even if the entity name "Macy's" is not present in the text content, part of the other text in the input content can be identified as a comment or a complaint, and the text of "kind of discolored" and "I don't like it" can be identified as carrying a sentiment value, which, in this case, is a negative sentiment value. In such cases, the system can determine that when the text is about a complaint or a comment, the user may want to communicate the complaint or comment to a relevant entity. The system can then suggest a communication address using the methods of the present invention. When an entity name is not present, the system can suggest likely entities based on the nature or type of other objects mentioned in the input, such as suggesting certain department stores based on the relevance between the object of "shirt" and retail stores in general. In such cases, the term in the text content such as "shirt" that is used for determining the relevance can be different or not literally matching a term in the description of the entity or address. On the other hand, in the case when an entity name is present, the system can also pop up a question or message such as "Do you want to send your comments to Macy's?" or in a more general case, the system can pop up a question or message such as "Do you want to send your comments to a relevant entity?" Generally, the user's intention to communicate can be identified by identifying various attributes associated with the text in the content, such as the grammatical, semantic, or contextual attributes indicating whether the text content contains a comment or complaint, or whether the text content contains a positive or negative sentiment or opinion, or a need or intention to communicate.

In some embodiments, no term in the text content directly matches an organizational or individual entity name in the data source. For example, the user may write in a note saying "This printer really sucks." In such a case, the term "printer" can be matched with other entries in the data source that are not organizational or individual entity names, but entities that are products or services or topics which are associated with or related to organizational or individual entity names, such as printer manufacturers or sellers, and the communication addresses associated with printer makers or sellers can be identified through associations in the knowledge data.

For one example, the knowledge data associated with the object or topic of "printer" can have different types or degrees of associations or specifications with its property or attribute terms, including the names of various printer makers or sellers, such as "HP" or "Brother", etc., as attributes associated with the object or topic of "printer", as well as communication addresses in the data source associated with these entities. In such a case, these printer makers or sellers can be determined as being relevant to the input content, and communication addresses associated with these companies can be retrieved and displayed to the user as suggestions, or the message can be sent to one or more of the addresses, without requiring the user to make extra efforts in looking for a way to communicate to these companies.

For another example, the data source may also contain knowledge data about various printer makers or sellers, and each of them is associated with information or a description about their products or services or other attributes. If the term "printer" is also a term used in the description of the companies or the description about their products or services, names of such companies and the communication addresses of these companies can be retrieved and used for sending the message to, or as suggestion for sending the message to, without requiring the user to make extra efforts in looking for a way to communicate to these companies.

In addition to the above examples, the same methods can also be applied to any other topics or topic categories or domains, where the terms do not have an exact match, but are semantically related to the same or a similar topic category or categories. For example, if the user writes a note saying: "I want to say that the US foreign policy needs to be changed." The system of the present invention can identify the terms such as "foreign policy" in the text string, and if sufficient knowledge data related to the topic or domain of politics exist in the data source, the system can check the term "foreign policy" with terms in the related knowledge data, and find relevant entities in the domain or topic categories such as the US government, US Congress, as well as senators or house representatives related to foreign relations, etc. When such entities are found to be relevant or relevant enough, their names or public communication addresses can be retrieved and displayed to the user. The message can also be sent to an appropriate address without requiring the user to know where and how to send the message. In this way, the user's voice can much more easily be heard by the policy makers and related branches of the government.

This is especially useful for people who are not very socially active or are not familiar with using social communication tools such as Twitter or blogs, etc., to express their opinions. When the system and methods of the present invention are implemented on a computer or any other computing devices such as a smart phone, when a user wants to voice an opinion or make a comment on certain things such as a product or an social economical or political issue, the user does not need to find out if there is a site he or she must go to, and does not need to spend time and efforts to go to that site, or learn how to use the site. All the user needs to do is to write or speak something to a computer or a smart phone, and the content will be sent to an appropriate address by the system of the present invention.

Meanwhile, the system can also offer an option either to send the message with the user's real name or address, or as a de-identified entity, such as an anonymous user, or through a proxy on behalf of the user.

Figure 3A:
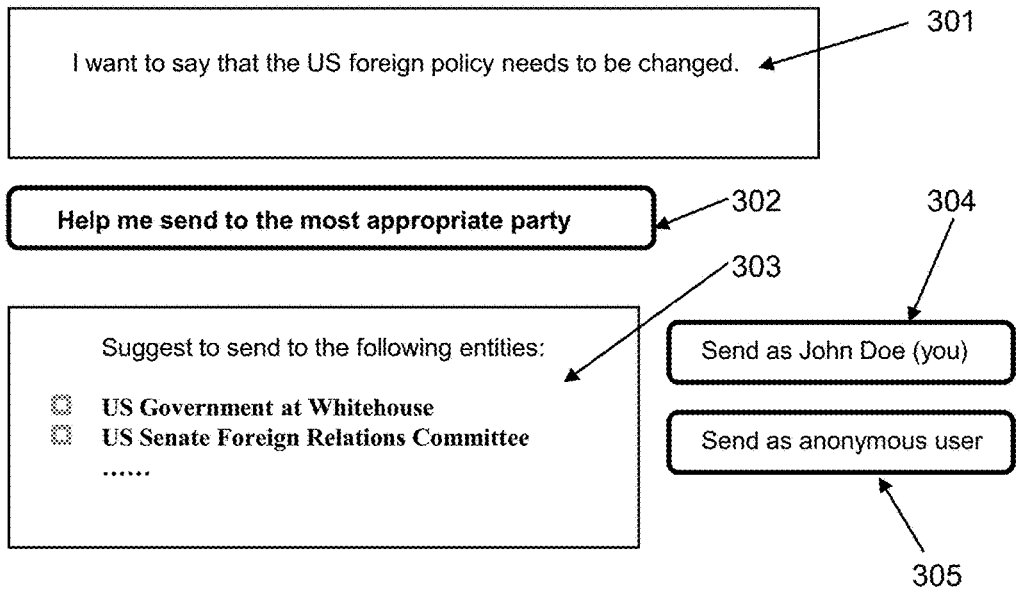
FIG. 3A is an illustration of suggesting an appropriate entity to communicate to based on the content.

FIG. 3A is an illustration of suggesting an appropriate entity for the user to communicate to based on the user-created content.

In FIG. 3A, a user enters a text content (301), the user may not know or may not bother to find out who the message should be sent to. The user clicks on a button (302) as a way to seeking help in finding an appropriate party to send the message to. The system of the present invention analyzes the text content, identifies terms and compares the terms against a data source, and determines a relevance measure for certain candidate entities, and displays the name or address of the most relevant entities as suggestion for the user to select (303). When sending, the user can use (303) or (304) to choose whether to send as an anonymous user or not.

Figure 3B:
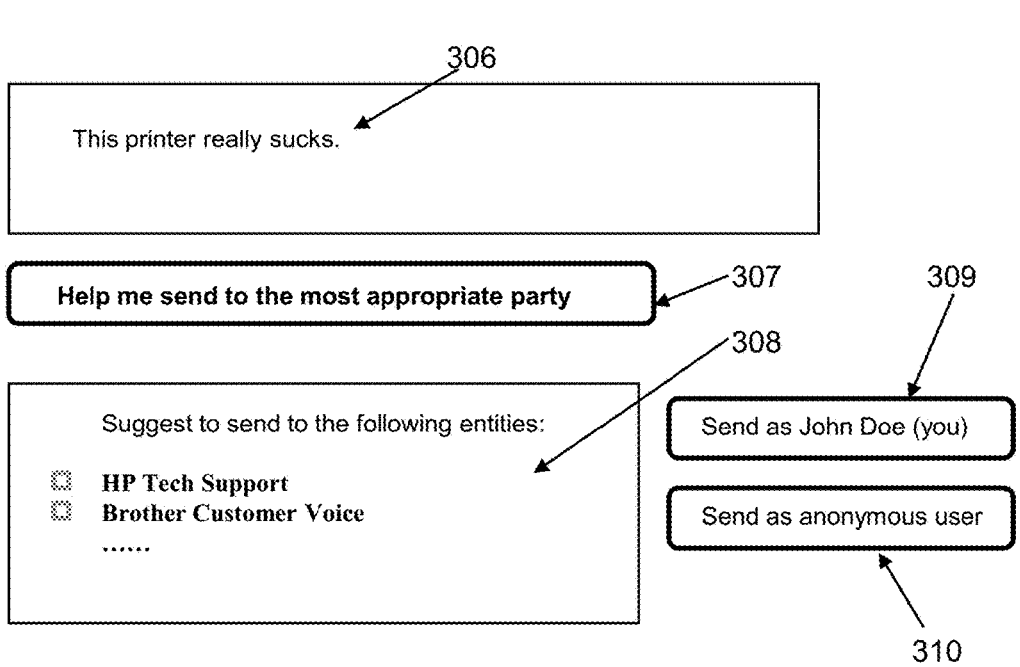
FIG. 3B is another example of suggesting a different entity to communicate to based on a different content.

FIG. 3B is another example of suggesting a different entity for the user to communicate to based on a different content.

Furthermore, the content can be sent to a content aggregator, either as a proxy for forwarding the message to an appropriate entity, or for data collection and data analysis on a global scale for topics, issues, and trends. A content aggregator can distribute and use a tool based on the present invention as a way to solicit user opinions and collecting data for analysis, in contrast to collecting data from social media sites, or requesting users to fill out surveys.

Determining a Relevance Measure Between a Content and a Communication Address:

In some embodiments, a relevance measure between an input content and a communication address can be determined directly without first determining a relevance measure between the input content and an entity associated with the communication address. This is particularly the case when a communication address is associated with a name or description or a label or a tag indicating its intended purpose or its affiliation with an entity. In such cases, methods for enabling a machine to understand the meaning of terms in the input content and also understand the meaning of certain terms in a description of a communication address can be applied. For example, the data source can contain an email address that is associated with a description such as "For Company A's product quality issues, please email to quality@CompanyA.com", or a name of the address such as "Email address for quality inquiries". In such a case, a relevance measure directly between the input content and the email address can be determined based on either a literal matching of the terms in the input content and terms in the description, or based on understanding the meanings of such terms if a literal keyword match is not found.

In this example, terms referring to the concept of "quality" can be pre-annotated in a data source, and when such terms are found in both the input content and a name or description of an address, a relevance measure between the input content and the email address can be directly determined based on the match, or further based on the grammatical semantic, or contextual attributes of the terms in both the input content and in the name or description of an address, such as whether the term is a grammatical subject, object, or other contextual attributes. Each term in either the input content or in the description can carry a certain weight, depending on the term's grammatical, semantic, or contextual attributes, and the total weight can be used to determine the relevance measure.

In some embodiments, terms in the input text can be matched with a sub-string of a communication address, such as the term "quality", which occurs as a standalone term in the input text content and a sub-string in the address of quality@CompanyA.com. In such cases, a relevance measure can be determined based on the match of the term with a sub-string of the address.

In some embodiments, whether a relevant entity is first determined or not, an entity may be associated with multiple communication addresses. In such a case, a determination can further be made as to which of the multiple addresses is the most relevant to the input content under a specific context.

For example, a company may have one email address for financial or legal information, and another email address for receiving customer feedback, etc. In some cases, each of the email addresses is annotated or is associated with a label or tag indicating the specific topics or attributes that the address is intended for, such as the example above for quality issues. In such cases, the relevance measure can be determined based on the terms used in the annotation or label.

In this example, when the user writes "I want to know why Company A's revenue did not grow as expected", the system of the present invention can first match the term "Company A" with an entry in the data source. If there is a match, an email address can be retrieved. If there is only one email address associated with Company A, the text content can be sent to that email address, either automatically, or the address can first be displayed to the user for confirmation.

If there are two or more email addresses associated with Company A, with one for financial information with a description such as "For financial information, please contact us at finance@ComanyA.com", and another for tech support with a description such as "For technical support, please contact us at support@ComanyA.com", the system of the present invention can either display the two addresses for the user to select from, or further match the terms in the input content with the terms in the descriptions of the addresses or in the address string.

If there is a match, the matched one can be determined to be more relevant.

If there is no match or there is a match with a term in both descriptions, other terms can be used for further disambiguation. For example, terms such as "revenue" in the input content can be further checked with the knowledge data to see what topic or domain is the most closely related with the term "revenue". In this example, when the data source contains enough knowledge data, the topic or domain associated with "finance" can be determined to be relevant based on the meaning or semantic attribute or relationships associated with the term "revenue", and the company's email address for financial information can be determined to be more relevant than the address for tech support. In such a case, the system can either display the more relevant email address to the user, or automatically use the more relevant email address for sending the message, or display both addresses but rank the more relevant one first as a suggestion for the user to select from.

Figure 4:
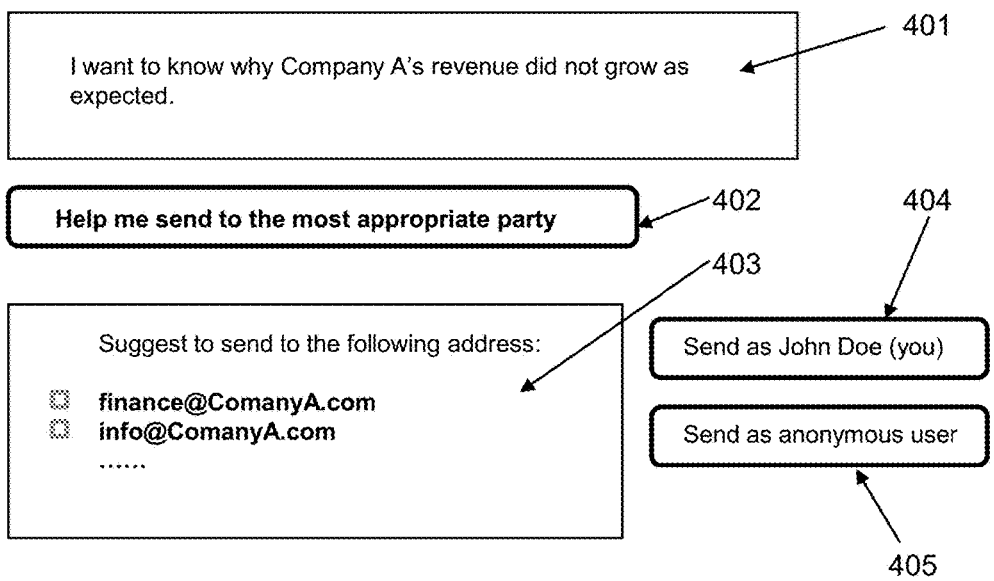
FIG. 4 is an illustration of suggesting one or more email addresses based on the content.

FIG. 4 is an illustration of suggesting one or more email addresses based on the content.

In FIG. 4, like illustrated in FIG. 3, the user can select a suggested address in (403) if one of the addresses is the right one to use, and send the message either with a real identity or anonymously by using (409) or (410).

In some embodiments, when an address is determined to be relevant to the input content and to be suggested to the user, the information associated with the address, instead of the address itself, can be output or displayed in a user interface as a representation of the address, and for the user to select or confirm. Such information includes the name or description of the entity associated with the address, such as illustrated in FIGS. 3A and 3B. In such cases, the address can be represented by the name or description of the entity.

As described above, when more than one address are determined to be relevant to the input content and to be displayed to the user, the rank order of the addressed can be based on the relevance measure.

Also as described above, instead of the address itself, one or more address representations such as entity names can be displayed to the user, and the user can select or confirm an entity name. Then, one or more addresses associated with the selected or confirmed entity can be displayed for the user to further select or confirm, before sending the content to the selected address.

More Methods for Determining Relevance:

Whether it is for determining a relevance measure between an input content and an entity such as a company, or between the input content and a communication address associated with an entity, in addition to directly or simply matching the terms in the input content and terms in the entity or address description or sub-strings in the address, more methods can be used to more accurately determine the relevance measure.

In some embodiments, a relevance measure or score can be determined based on the grammatical, semantic, or contextual attributes associated with the terms either in the input content or in the annotation or description or label associated with the address or with the entity.

Terms in a text content can be of different degrees of importance or prominence in conveying information, or in representing information such as topics or objects. A relevance measure or score can be determined to indicate how relevant an entity or a communication address is to the input content based on the importance or prominence measure associated with terms in the input content that match terms in the data source, or vice versa.

For example, an importance or prominence measure can be determined for each term in the text content or in the description of an entity or address based on a grammatical, semantic, and contextual attributes associated with the term. In the above-mentioned US patents and patent applications, system and methods are disclosed for determining the importance of terms in the text content, and for discovering prominent topics in the text content. The disclosures in these referenced patents are incorporated herein by reference.

The grammatical attribute includes at least the grammatical roles of subject, predicate, part of a predicate, a modifier or a head of a phrase, or a sub-component of a phrase, and parts of speech. The semantic attribute includes at least semantic roles or attribute types or values or meanings.

The contextual attribute includes the grammatical or semantic attributes associated with words or phrase in the context of a term, such as the surrounding terms, and their grammatical and semantic relations, as well as including the positional and distance attributes, such as where in the sentence a word occurs and how close or far away a word is from another word. The position of the term can also include a position in the first N terms in the text content, or in the title of the text content, or a relative position of the first term to a third term associated with a specific meaning, such as before or after the third term, or within a pre-specified distance from the third term, or a specific relationship with the third term or one or more characters including punctuation marks.

When a grammatical attribute is used, a different weight can be associated with a term when the term is associated with a different grammatical attribute, such as when the term is a subject of a sentence versus when the term is not the subject of a sentence, or when the term is a head term in a multi-word phrase versus when the term is a modifier in a multi-word phrase, or when a term is a noun versus when a term is a verb, or a noun is in a prepositional phrase with a specific preposition, etc.

When a semantic attribute is used, a different weight can be associated with a term when the term is associated with a different semantic attribute, such as when the term is associated with the semantic role of an agent or recipient of an action versus a different role, or a term is a company or product or service name versus a different name, or a term carries a positive sentiment or opinion versus a negative or neutral sentiment or opinion, etc.

When a contextual attribute is used, a different weight can be associated with a term when the term or a second term within the contextual scope of the term is associated with a grammatical, semantic attribute, or within a relative distance from the term, or a relative position or location in the sentence or paragraph, etc.

Furthermore, in addition to using the grammatical, semantic and contextual attributes, the importance or prominence measure can also be determined for each term based on the frequency of the term in the text content, or its frequency in text contents other than or external to the current input content.

When an importance measure is obtained for terms in the input content, the relevance between the input content and an entity or the entity's communication address can further be determined based on the importance or prominence measure of a term in the input content that matches a term in the data source.

For example, when the terms in the data source are further associated with an association strength value, such as in the example illustrated in FIG. 2, the relevance measure can further be determined based on the association strength value corresponding to the matched terms.

In the above-mentioned US patents and patent applications, as well as U.S. Pat. No. 8,972,396 entitled "System And Methods For Determining Relevance Between Text Contents", and U.S. Pat. No. 9,262,395 entitled "System, Methods, And Data Structure For Quantitative Assessment Of Symbolic Associations", detailed methods and systems for determining term importance or relevance measures based on the grammatical, semantic, and contextual attributes of the terms as well as based on association strength values are disclosed. The disclosures are incorporated herein by reference.

On the other hand, the grammatical, semantic, and contextual attributes of the terms in the data source, such as in the annotation or description or label associated with the communication address, can also be used in the same way for determining the relevance between an input content and a particular address.

For example, if a company's email address is associated with such text as "For information regarding financial status, please send an email to finance@CompanyA.com", then using the system and methods as described above and in the above-referenced disclosures, terms such as "financial status" can be determined to be more important than other terms such as "information", or "email", etc., based on their grammatical, semantic, and contextual attributes, and can play a more important role in determining the relevance between the input content and the email address for financial inquiries.

In addition to the above examples with a company, the same methods can also be applied to any other topics or domains. For example, if the user writes a note saying: "I want to tell Barack Obama that the US foreign policy needs to be changed.", the system of the present invention can identify the terms such as "Barack Obama" in the text string as being more important that other terms based on the grammatical attribute of being an object, and semantic attribute of being a president, and being the recipient of the action of "tell", etc. If sufficient knowledge data related to the entity "Barack Obama" exists in the data source, which can further be associated with a description about the president of the United States, with terms such as "foreign policy", being more important than other terms in the description text, the system can more accurately determine a relevance between the text content and the US government, and can further obtain the public communication addresses such as the email address published by the White House, and can display the address to the user as a suggestion or for confirmation, or send the message automatically, without requiring the user to know where and how to send the message. In this way, the user's voice can much more easily be heard by a country's president or government.

In some embodiments, when the input is a content with certain types of metadata, such as a webpage, or an image, in which the metadata can contain information about the major topics or objects contained in the content, such metadata can also be used to match entries in the data source for determining the relevance between the content and an appropriate entity or a communication address.

In some embodiments, when the input is an image containing multiple objects, various objects can be recognized from the image, and an importance or prominence measure can be determined for each object based on what specific object it is, such as a human face, an animal, or a product, etc.; or based on what other attributes are associated with the object, such as its surroundings; or based on its perceptual attributes against other objects or against the background. Perceptual attributes can include the light intensity, contrast, color, shape, size, position on the image or relative position to other objects, relative distance, and repetition patterns, etc.

Suggesting Addresses Based on a Known Entity or Address for Sending/Sharing Contents:

The above examples are mainly for finding and suggesting entities or their communication addresses that are not known to the user, or not in the user's address books, and the system and methods of the present invention can help users find the appropriate entities and addresses to communicate to.

In addition to obtaining communication addresses from external sources, in some embodiments, the entities or communication addresses for suggestion can also include the entities or addresses known to the user, or selected from a collection of entities or addresses associated with the user, such as the ones that are on a user's contact list or address book.

To distinguish from the communication addresses associated with external entities not necessarily known to the user, in the present invention, the user's collection of addresses refers to a dataset containing addresses or contact information that is entered by the user or entered with the user's permission, or the addresses or entities that the user has previously communicated with, including the one entered by a communication tool such as an email tool, based on the user's communication history.

Without the system and methods of the present invention, each time a user needs to send or share something with someone, the user needs to launch a communication tool, and select the intended address from probably a very long list of addresses. This can be an inconvenient and time-consuming process. Certain service providers currently in the market may help the user to either launch an application or find an address in some way, but they are not able to automatically suggest an address for the user to use, based on the content that the user is either writing or reviewing.

The system and methods of the present invention can be applied to the cases when the user wants to send or share something with someone the user knows or with someone whose address is known or available to the user. With the system and methods of the present invention, entities as described above can also include a friend or co-worker or a family member or a business associate of the user, and an address can be suggested depending on the content the user is creating or viewing.

First, like with other entities in the data source, various types or forms of knowledge data associated with persons whose contact information are known or available to the user can also be obtained and stored in the data source. For example, user profiles containing information or descriptions about various aspects of the person, such as the person's name, interest, connections, activities, etc., can be created. Such information can be stored in the form that includes a description file or data tables or association datasets or knowledge graphs as described above. The method for determining the relevance with unknown entities or addresses as described above can equally be applied to this case. Thus, when a user is composing a message or writing a document or viewing a content that contains text or an image, the system of the present invention can make suggestions or display the names of relevant persons or their communication addresses, either automatically, or based on the user's indication to send or share, based on the content.

Figure 5A:
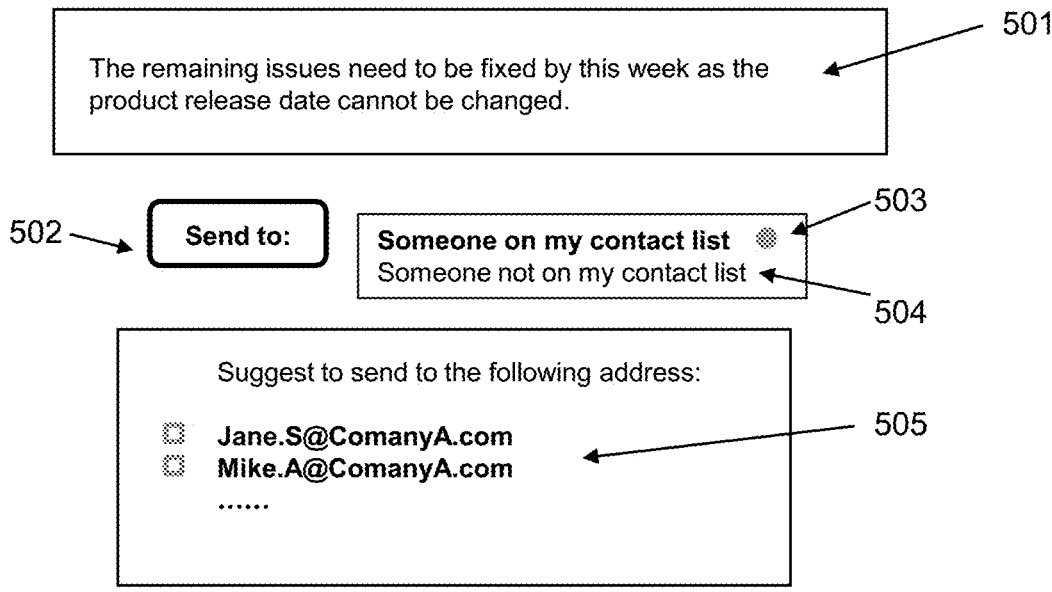
FIG. 5A is an illustration of suggesting an email address selected from a user's contact list based on the content.

FIG. 5A is an illustration of suggesting an email address selected from a user's contact list based on the content.

In FIG. 5A, a user writes some text (501) in a text editing tool's user interface, such as in the interface of a tool based on the present invention, where the editing tool is not necessarily an email composing tool. The user may need to focus on what needs to be written down first before deciding which communication tool to use and which addresses to send to. The user can click on the "Send to" button (502), optionally also select a recipient type from a list, such as whether the recipient is in the user's contact list (503) or not (504). The system of the present invention analyzes the text content, identifies terms and matches the terms against a data source, in which user profile data or communication history data can be checked against the terms in the content or certain topics represented by the terms in the content, and determines a relevance measure for certain candidates, and displays the name or address of the most relevant entities as suggestion for the user to select (505).

Figure 5B:
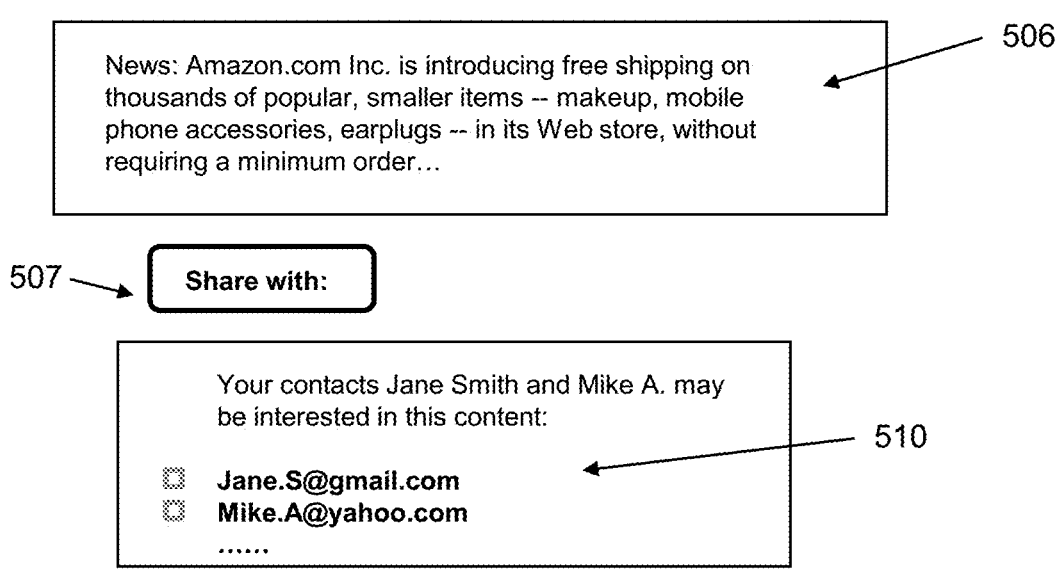
FIG. 5B is an illustration of suggesting an email address selected from a user's contact list based on the content when the user indicates to share the content with someone.

FIG. 5B is an illustration of suggesting an email address selected from a user's contact list based on the content when the user indicates to share the content with someone.

In FIG. 5B, a user is viewing a web content, such as a news article (506). The user wants to share the article with someone on his contact list. The user can click on the "Share with" button (507). The system of the present invention analyzes the text content, identifies terms and matches the terms against a data source, in which user profile data or communication history data can be checked against the terms in the content or certain topics represented by the terms in the content, and determines a relevance measure for certain candidates, and displays the name or address of the most relevant entities as suggestions for the user to select (508).

In some embodiments, even before the user indicates an intention to send or to share, a message such as "Your contact John Smith may be interested in this content." can automatically be displayed to alert the user that the content can be shared with someone the user knows, before displaying the address of that person.

In some embodiments, the suggested addresses can automatically be displayed before the user indicates to send or to share.

In addition to the example illustrated in FIG. 5A above, when making suggestions for communication addresses, in some embodiments, when a contextual clue can be identified that the text content is a message to be sent to a recipient, a simple term-matching between terms in certain parts of the input content and certain parts of the entity description or the address string can be used to determine the likelihood of an entity being relevant to the content.

For example, if a user is composing an email, and the user starts with "Hi John", the contextual clue that the text is a message to someone can be identified by the phrase "Hi John", or by identifying a greeting word followed by a name, or a phrase like this being the first line of the text content, or the term is followed by a punctuation mark that indicates preceding text being a salutation part of a message, or the text editor being used is a messaging tool like an email or chat tool. Then the term "John" can be directly matched with the name of an entity in the data source if the user's contact list or address book contains an entry for someone whose name is "John", or matches a term in the address string itself, such as "john@gmail.com". When a match is found, the address can be selected as a candidate for suggestion. With this feature, the tool can provide a better user experience for the user as well as enhanced productivity.

Furthermore, other clues such as grammatical or semantic attributes associated with the terms can also be used. For example, the word "John" can be identified as semantically representing a person's name; and the word "Hi" can be identified as semantically representing a greeting or salutation, etc.

Figure 5C:
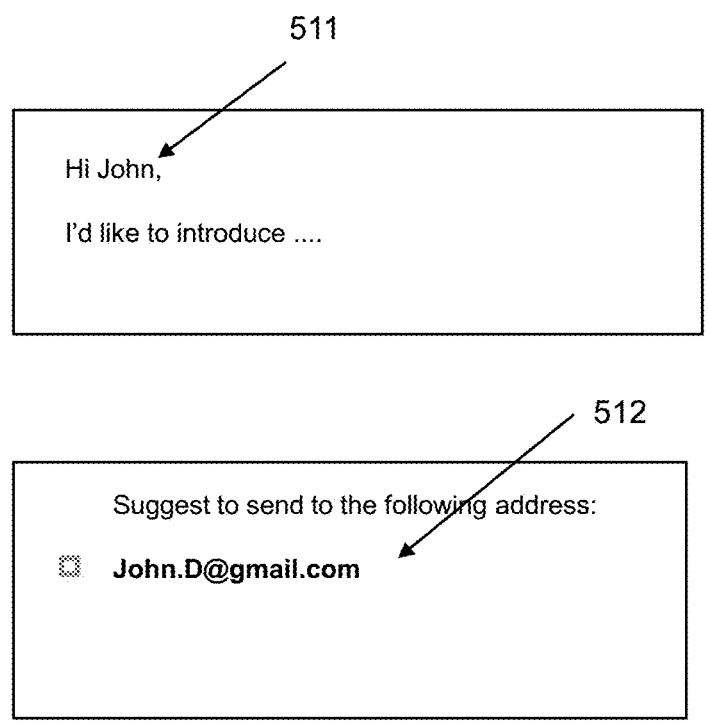
FIG. 5C is an illustration of suggesting an email address based on the terms in the content that indicate a recipient name.

FIG. 5C is an illustration of suggesting an email address selected from a user's contact list based on the identification of a term that represents the name of a recipient, based at least on the contextual clue of the text being a message to be sent. In FIG. 5C, the name of a recipient (511) is identified using the method as described above, and if an email address contains the name, or the description of the email address contains the name, that email address (512) can be selected as a candidate for suggestion, or can be displayed as a suggestion.

Other methods described above for determining relevance and suggesting an address that is not known to the user based on a relevance measure can also be applied when selecting known addresses from a user's collection of addresses.

Making Suggestions for Communication Addresses or Communication Tools Based on Probability or Association:

In some embodiments, the suggestions or recommendations can also be based on the probability or association data of the type of content being sent to a particular person, a particular address, or using a particular communication tool such as an email tool, a chat tool, or other types of messaging tools. This type of data can be obtained from the history of similar contents being sent in the past. For example, as described above, in the case of a text content or image content, topics or objects can be identified using the methods described above and in the referenced disclosures. If a topic or object has been frequently associated with a particular person, or frequently associated with a communication address, or frequently associated with a communication tool, such as an email application or share-enabled storage application, the system can suggest the person or the address or the tool as relevant for sending or sharing the content, or can display the name of the person or his/her communication address or a particular communication tool, based on the content, either automatically or in response to the user's indication to send or share.

In some embodiments, the relevance can be represented by an indicator, which can further be a value, and the indicator can also be called an association strength indicator.

In some embodiments, the indicator is represented by a numerical value. In some other embodiments, the indicator is represented by an output from a pre-trained machine-learning model, such as a Bayesian classifier, an artificial neural network, or some different model.

In addition to determining the relevance or association strength indicator based on frequency of association in the past, the indicator can also be determine based on the recency of the association, such that a most recently used address or communication tool with a specific term or topic can be determined to be relevant for suggesting the address or the tool.

In some embodiments, an option can be provided to the user to manually specify that a specific term or a topic or object, including an object in an image, can be associated with a specific address or entity, and the system can display or select the address as the default address for the input content that contain the term or is related to the topic or object.

Furthermore, a specific communication tool, such as an email account registered with a specific service provider, or a sharing-enabled file storage, can by itself be associated with a person or an entity of another type, or with a communication address, or with a content type, based on historical usage data. A likelihood or probability value can be determined based on the historical data, and if the value is above a threshold, and when a content or an address or entity is identified, a relevant communication tool can be suggested to the user.

For example, if the user has multiple communication tools, such as multiple email accounts with different service providers, generally the user can use any of the tools to send a content to a person or an address. Conventional methods will have to first ask the user to select a communication tool, and within that tool, find the person's address. In contrast, with the present invention, not only the address can be automatically retrieved without the user spending time in find the address, the communication tools that is most likely used by the user to communicate to a particular person, or to a particular address, or to communicate a particular type of content, can also be automatically suggested to the user. The probability or association data can be obtained from the usage pattern in the past, such as the frequency or recency of use. This is in addition to the non-probability or non-association type of relevance measure described above.

Figure 6:
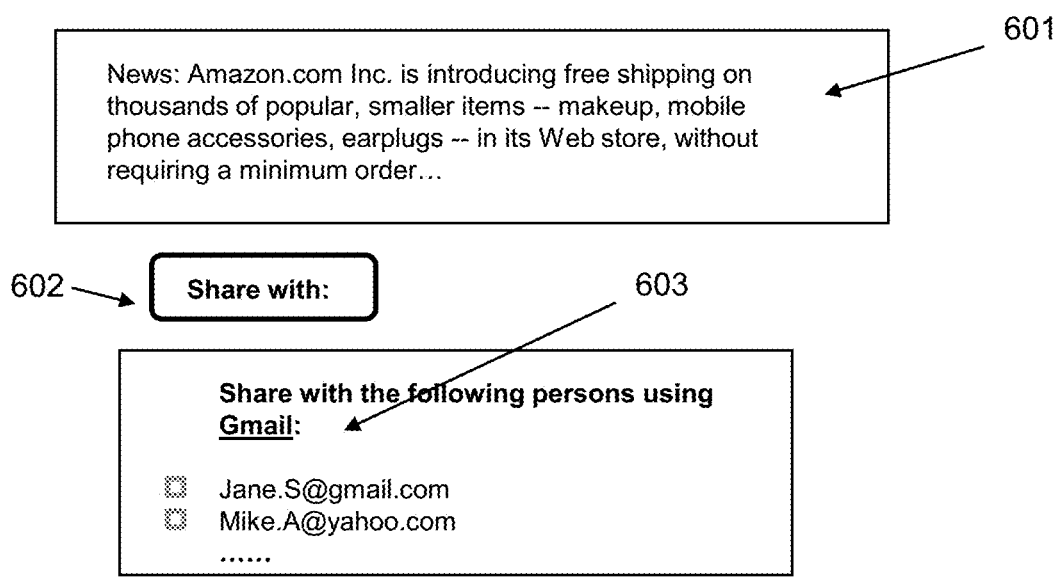
FIG. 6 is an illustration for suggesting a communication tool.

FIG. 6 is an illustration for suggesting a communication tool.

In FIG. 6, when a user is viewing a web content, such as a news article (601). The user wants to share the article with someone on his contact list. The user can click on the "Share with" button (602). The system of the present invention analyzes the text content, identifies terms and matches the terms against a data source, in which user profile data or communication history data can be checked against the terms in the content or certain topics represented by the terms in the content, and determines a relevance measure for certain candidates, and displays the name or address of the most relevant entity or entities as suggestions for the user to select. In addition to that, the system can further check the past history of communications with the address in terms of which communication tool is used the most often or most recently with the address, or which type of content is most often or most recently associated with the communication tool, or which person is most often or most recently associated with the communication tool, and then make a suggestion for using a particular communication tool to send or share the content (603).

For obtaining the association data, other attributes, such as the grammatical, semantic, or contextual attributes described above, can also be used to identify one or more specific terms to be used for determining the associations between the term and the communication address, entity, or the communication tool.

Making Suggestions for Communication Addresses or Communication Tools Based on User Specification:

In addition to using the relevance or probability or association for making suggestions for communication addresses or communication tools, in some embodiments, the association between a specific term or terms in the input content and a communication address or tool can be pre-specified by the user, so when the user enters a term in a text editor or communication tool, or is viewing a content that contains the term, the system can suggest a communication address or tool that is pre-specified by the user, for sending or sharing the content to the address.

For example, the user may specify that if a message being composed contains the word "finance" or "financial report", then the address of person A, who may be the head of finance, can be displayed as a suggestion or automatically filled in the "To" or "cc:" field, etc.

Furthermore, the user can specify a specific context, and if the word "finance" occurs in the context, then the address of person A can be suggested. For example, the user may specify that if the word "finance" occurs in the first 10 words in a message being composed, then the address of person A can be suggested; or if the word occurs within a certain distance from other words such as "department", "report", "balance sheet", "investment", etc., then the address of person A can be suggested.

Furthermore, other attributes associated with the term, such as the grammatical, semantic, and contextual attributes as described above and in the above referenced disclosures, can also be specified as conditions for suggesting a communication address. For example, if the word occurs in the grammatical subject position of the first or first N sentences, or if a word that matches person A's name or a product name, and occurs in the first or first N sentences of the message, then the address of person A can be suggested.

With more detailed analysis of the content, the user can further specify that if the content is identified as being about a certain topic or topic categories, such as the topic of investment, then the address of person A can be suggested, even thought the word "finance" does not occur in the content.

The above methods can also be applied when the user is not composing a message, but reading or viewing a content, such as a webpage, an image, or a video, and an address can be suggested for sharing the content.

For example, the user can specify that if the word "finance" occurs in the title of a webpage or a document, then the address of person A can be suggested. The user can further specify that the suggestion can be displayed either before or after the user has indicated an intention to share the content, such as pressing a button.

Other attributes associated with the term, as described above, can also be used for specifying a condition for suggesting an address when the user intends to share the content. For example, if the term occurs in the metadata or description of the webpage or document, or if the term is associated with other attributes such as the grammatical, semantic, and contextual attributes, then the address of person A can be suggested.

In some embodiments, especially when the content is not displayed in a communication tool like an email composing tool, the user can further specify that a specific communication tool can be used or suggested for sending or sharing the content if the term occurs in the content or if one or more other conditions as described above are met.

In some embodiments, a relevance measure, such as a score or value, can be determined for a given content and a given address or a given communication tool, based on the degree of matching of the attributes or conditions.

When multiple address or communication tools are suggested, they can be displayed in an order ranked by the relevance measure.

Making Suggestions for Categorizing Contents Based on User Specification:

This type of user specification can also be applied to categorizing contents, including various documents or emails. Conventional methods for categorizing or classifying documents like emails are based on using metadata or historical usage data, such as letting the user to specify whether an email should be categorized into a specific category based on attributes such as the sender of the email, or based on an automated content analysis that is not based on user's specification about specific terms in the content and their attributes, such as the contextual, grammatical or semantic attributes described above.

The present invention allows the user to define a category and associate the contents with the category based on a specification about specific terms used in the content as well as based on the various contextual, grammatical, or semantic attributes associated with the terms. For example, the user can specify that an email containing the word "finance" in the first 10 words can be categorized or labeled as belonging to the category of "finance" or "investment", or the word "finance" occurs as the grammatical subject of the first or second sentence, or within a certain distance from other words such as "balance sheet", etc., can be categorized or labeled as belonging to the category of "finance" or "investment"; or if the email contains a word that matches a predefined product name list, then the email can be categorized or labeled as belonging to the category of "product", etc.

Other attributes, such as the various other grammatical, semantic, or contextual attributes described above, can also be used for the user to specify the conditions for associations between the term and the communication address, entity, or the communication tool.

These specific contextual attributes or conditions, or context types or context patterns associated with a specific term in the content can be pre-defined or be detected at processing time, and can be presented to the user as suggestions for specifying specific terms or contextual conditions for relating or associating the content to a certain category, or to a certain communication address or communication tool, etc. A weight value can further be assigned to the feature based on the user selection or specification, and a relevance measure can be determined based either on the specific context type or pattern, or based on the specific weight values.

More generally, the same methods can be used to provide a user-guided machine learning process, in addition to making suggestions as described above. A term in the above examples is a feature that is specified by a user for a specific learning task, such as association or classification. The term specified by the user can be treated as a more prominent or important feature for classifying the content that contains the term, as compared to other features that require a machine to detect through trial-and-error. And compared with the conventional machine learning methods that try to learn all the features by the machine itself through trial-and-error, the present methods of providing human guidance can provide the advantage of significantly reducing the computer resource requirements, while increasing the accuracy of the learning results, as a human user is much more intelligent than a computer program that is based on trial-and-error.

In some embodiments, the relevant categories or communication addresses or tools can first be displayed as suggestions, and the user can select or confirm the most relevant ones.

In some embodiments, a relevance measure, such as a score or value, can be determined for a given content and a given category based on the degree of matching of the attributes or conditions.

When multiple categories are suggested, they can be displayed in an order ranked by the relevance measure.

Making Suggestions for Services Based on the Content:

In addition to finding communication addresses and making suggestions for communication address, entities, or tools as described above, once an object or topic in the input content is identified, other types of services or information can also be suggested or provided to the user.

For example, when a user enters some text from a user interface, the system of the present invention can detect whether the text is a question or a statement. If the text is a question, such as "Can an engineer change his career from hardware design to data science?" or a statement that represents a request for information, such as "I want to know how an engineer can change his career from hardware design to data science", the system can suggest one or more website addresses that provide answers to questions, or send the question text to an appropriate site or address, and can further transform or convert the question text into a webpage content.

This feature can be especially useful when the user does not know where to find an answer, or the user is in a place that is not designed to provide answers to questions. For example, the user may be in the middle of composing an email or chat message using a composing tool, which, conventionally, is not a search tool, or using a generic messaging tool such as the one illustrated in FIGS. 3A and 3B; or the user's question is mixed with other text content such that the question needs to be identified using a linguistic analysis method, or extracted from the rest of the text content.

In U.S. patent application Ser. No. 14/961,882 entitled "Methods for Information Extraction, Search, and Structured Representation of Text Data" filed by the present inventor, methods for identifying various types of questions are disclosed. A question as a request for information can take various linguistic forms and with various linguistic structures, such as a Wh-question, Yes-No question, or in non-question format like a statement or imperative, etc. The disclosure of this application are incorporated herein by reference. These methods can be used for identifying questions in an input content.

Furthermore, the system of the present invention can collect or search known answers from various sources, and if a question or a request for information is detected, certain answers can be displayed automatically as a service to the user.

Figure 7A:
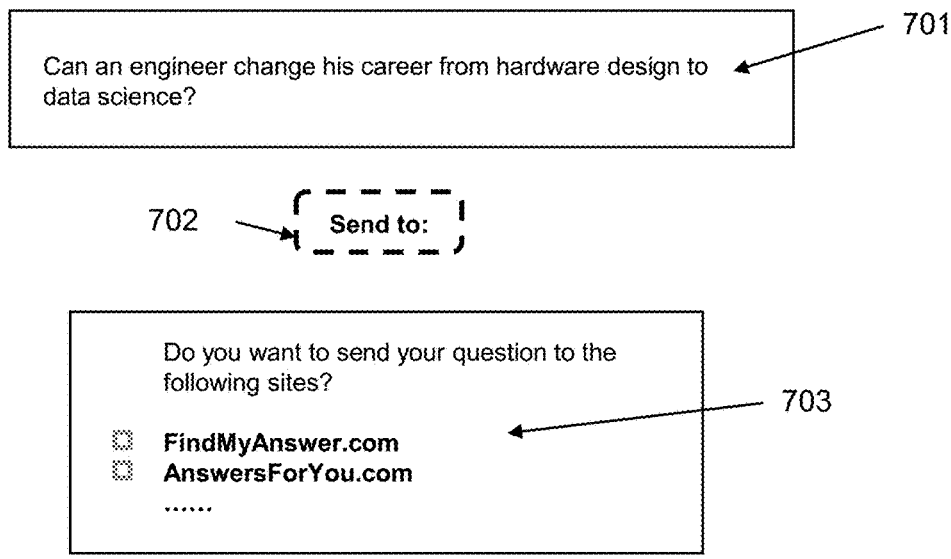
FIG. 7A is an illustration of a user interface with functions of sending questions to a site for an answer.

FIG. 7A is an illustration of a user interface with functions of sending questions to a site for an answer.

In FIG. 7A, a user may write a question in a text editor's user interface (701). The text editor can be any software tool that accepts text input, such as an email composing window. The button (702) for sending the content to somewhere is optional as indicated by dotted boarder line. The system can detect that the content is or contains a question, and can further determine that the question may be of the type that can be asked on a question-answer website. The system then gathers from its data source appropriate or relevant websites or web addresses; and displays them as suggestions (703) for sending the question. In some embodiments, the system can transform the content into a Web format and send the content to the site.

Figure 7B:
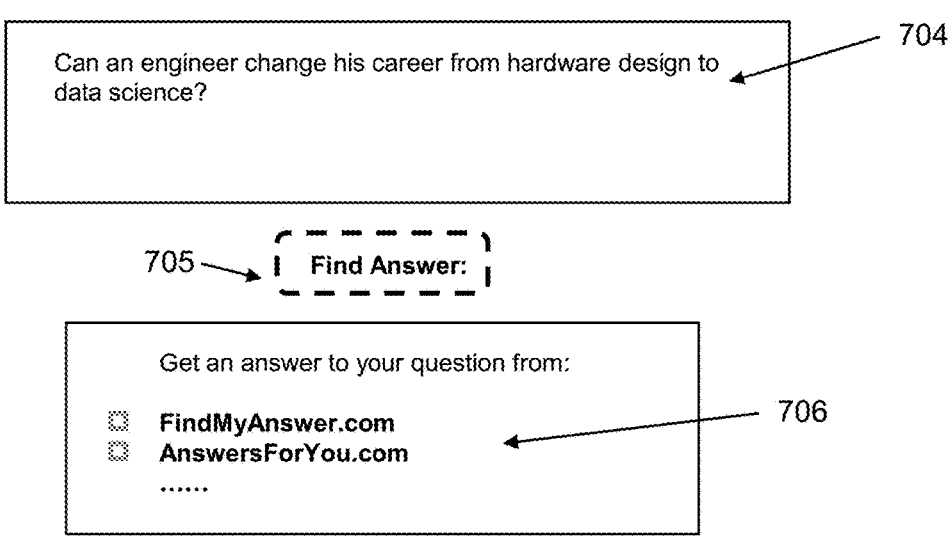
FIG. 7B is an illustration of a user interface with functions of providing answers to a question as a service to the user.

FIG. 7B is an illustration of a user interface with functions of providing answers to a question as a service to the user.

In FIG. 7B, a user may write a question in a text editor's user interface (704). The text editor can be any software tool that accepts text input, including an email or chat composing window. The button (705) for getting an answer to the question is optional as indicated by dotted boarder line. The system can detect that the content is or contains a question or a request for information, and can further determine that the question may have a relevant answer from certain sources such as a question-answer website, or from any other source. The system then retrieves one or more answers from one or more websites or other sources; and either displays the source names (706) or displays the answers (not shown).

The methods for determining whether there is a likely answer to a particular question in the user input include matching or comparing the terms in the question with terms in a similar question that has an existing answer, or by first analyzing the grammatical, semantic, and contextual attributes associated with certain terms in the question, using a method as described above and in the above referenced disclosures, and matching the terms based on the specific attributes.

For example, for a question such as "Who is the president of that country?" the word "who" and "president" in the sentence have different grammatical and semantic attributes than other terms in the sentence, such as being a subject of the sentence or being a noun in a predicative of the sentence, and can be weighed more than other terms when matching a similar question that has an existing answer.

Another method is to identify the term representing a topic or object that is being questioned, such as the term "president" in the above example.

The referenced patents by the present inventor listed earlier provide methods for identifying a topic in a question. The disclosures of which are incorporated herein by reference.

In some embodiments, when suggesting sending a user's question to a question-answer site, as illustrated in FIG. 7A, the system can first check whether a similar question has been asked by someone else, and display the suggestions only when a similar question exists. This can help enhance the accuracy rate of the suggestions.

Linguistically, questions can be identified using certain methods. The simplest way is to identify a question mark used in the language. Other methods can include identifying the grammatical structure of a sentence for questions, or the presence or location of a question word, such as the Wh-word or an auxiliary word in the English language in the beginning of a sentence. For example, in the English language, a question starts with what is known as a Wh-word is usually a request for information, such as "Who is the president of that country?" "What can a person do with 100 dollars?" etc.

Also shown in the above examples, certain sentences in the non-question format, such as a statement, can also represent a request for information, like the sentence "I want to know the name of the person who invented bicycles", or "I wonder if humans can live on Mars." etc.

In some embodiments, a word list can be compiled to contain words such as "know", "wonder", etc., that semantically represent a desire to know or to have information. Then, words in the list can be used to determine whether a sentence represents a request for information.

While not all questions are requests for information, or not all questions are general enough to have existing answers that do not change over time, grammatical and semantic analysis can be further performed to identify whether a sentence in the user input contains a request for information, and whether the request is for information about general facts that do not change over time or vice versa.

In some embodiments, the question text or terms in the question or in a request for information statement can be extracted to form a search query, and a search such as a web-based search or local device search can be performed, either automatically in the background, or in response to a user indication, and the search result can be gathered from one or more sources, and can be displayed to serve the user's information need in a more automated and intelligent way.

The above example of identifying a question as a request for information is an example of identifying a user's need or intention in the user input content, and using this information to provide a service to the user.

In addition to identifying or detecting a user's need to communicate to an intended party, or for a specific type of information, other types of user intention or needs can also be detected from the content the user is creating, and the needs can be served by providing relevant information.

For example, when a user enters some text from a user interface, the system of the present invention can detect whether the text conveys intent to acquire or purchase a product or service, such as "I need to replace my old computer, but I will keep my mobile phone for a while." Once the intent to buy a computer is detected, the system can suggest one or more websites or stores that sell or service computers, or can provide related information about the product such as price comparisons. Conventional approach to advertising based on user content relies on keywords detection, such as the keyword of "computer" or "mobile phone". However, without the intent analysis or detection, the accuracy rate or relevance can be low. For example, in this example, the user only needs to replace "computer", but a simple keyword match can also take the keyword "mobile phone" as being relevant to providing advertising or services, which would be incorrect or irrelevant from the context.

Figure 8:
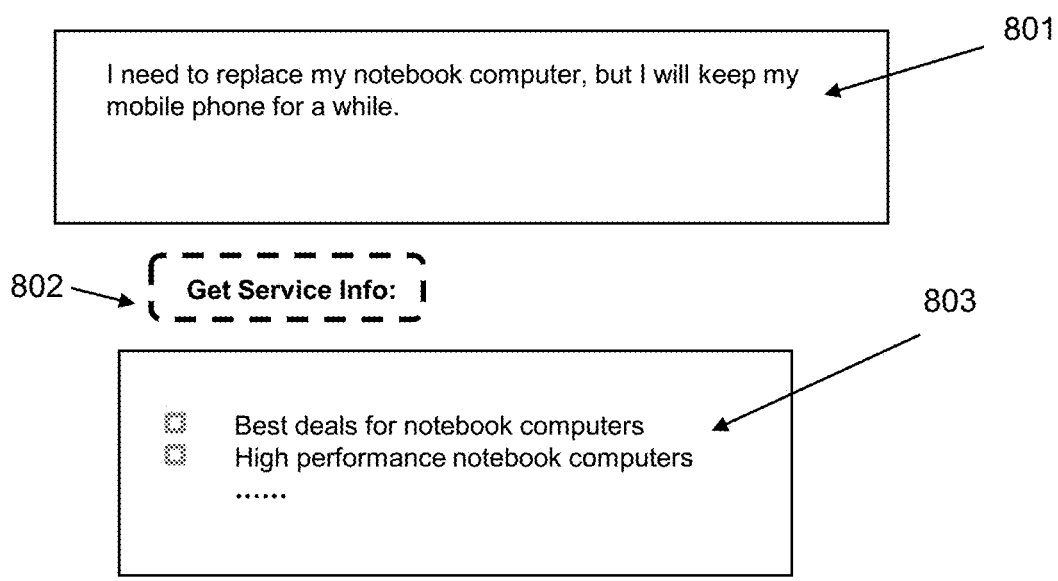
FIG. 8 is an illustration of a user interface with functions of providing information related to what the user intends to do.

FIG. 8 is an illustration of a user interface with functions of providing information related to what the user intends to do.

In FIG. 8, a user may write something in a text editor's user interface (801). The text editor can be any software tool that accepts text input, including an email composing window. The button (802) for getting offer/service information is optional as indicated by the dotted border line. The system can detect that the user has expressed an intention to acquire a notebook computer, but no indication that the user also wants to purchase a mobile phone. The system retrieves one or more seller/supplier offers or advertisements from one or more websites or other sources, and displays the info (803) in the user interface.

Similar to the case of detecting a question and serving an answer as described above, this feature can be especially useful when the user is not specifically performing a search function to find the needed information, or the user is in a place that is not designed to provide this type of information. For example, the user may be in the middle of composing an email or chat message using a composing tool, which, conventionally, is not a search tool, or using a generic messaging tool such as the one illustrated in FIGS. 3A and 3B; or the portion of the text that represents the user's intention or need is mixed with other text in the content such that the user's intention or need needs to be identified using a linguistic analysis method, or extracted from the rest of the text content.

In U.S. patent application Ser. No. 13/798,258 entitled "System And Methods For Determining User Interest Or Intention Based On User Expressions" filed by the present inventor, system and methods for detecting user intent based on text content created by the user are disclosed. The system and methods in the referenced patent application analyze the grammatical, semantic and contextual attributes associated with various terms in the text content, detect a user's intent, such as an intent to purchase a product or service, and estimate the degree of urgency of such an intent, for providing the most relevant information to the user. The disclosures in this patent application are incorporated herein by reference.

Briefly, the system and methods in the referenced disclosures identify terms such as the names of a first or second or third person, a product or service or activity, as well as terms that express a meaning of need, deficiency, desire, satisfaction, possession state, intention to acquire, interest, plan, time of an intended or desired action or plan, etc.; and further identify the contextual relationships among such terms, such as whether the intention is expressed by a first person or a second or third person, whether the intention is for something needed in the past or present or future, and how strong a user's interest in something is, such as very much interested or needed, not so much interested or needed, or not interested or needed. Furthermore, the grammatical relationships among the terms such as the relationships between a subject of a sentence, a verb, an object, a preposition phrase, and adjective or adverb are also identified. Based on such attributes and contextual information, the system and methods determine a relevance measure for a term that is a name of an item that can potentially be advertised, and allow a merchant to bid for an advertisement to be displayed to the user, based on the relevance measure.

It should be noted that the above examples are mainly with contents containing text for illustrative purposes. The system, methods, and user interface illustrated with the specific examples are equally applicable to other types of contents, such as images, an audio/video contents, and can be applied to other areas or domains without deviating from the principles and the spirit of the present invention.

What is claimed is:

1. A computer-implemented method for assisting communications, comprising:
   receiving an input content from a user, wherein the input content contains two or more terms each comprising a word or a phrase, wherein the input content is received without also receiving a recipient address from the user to send the input content to;
   identifying at least two terms in the text content, with one of the at least two terms identified as representing a topic, and the other of the at least two terms identified as representing a comment or opinion on a topic;
   identifying a first term in the input content, and determining that the first term represents a comment or opinion on a first topic;
   receiving, from a data source, a first communication address, wherein the first communication address is associated with a first entity, wherein the first entity includes a person or an organization that does not have a known personal or organizational relation with the user, wherein the data source is compiled by incorporating a textual description about an attribute associated with a business or activity conducted by the first entity, wherein the first communication address is received from a source other than the user's collection of addresses, and the first communication address does not exist in the user's collection of addresses and does not exist in the user's organization's collection of addresses, wherein the user's collection of addresses is defined as a dataset containing addresses or contact information that is entered by the user or entered with the user's permission, or containing the addresses or entities that the user has previously communicated with;
   identifying a second term associated with the first communication address;
   determining that the second term is relevant to the first topic;
   identifying a relation between the first term and the first communication address based on the first term and the second term;
   determining, based on the relation, the first communication address or the first entity as a candidate for the user to send the input content to, wherein the user does not know which electronic communication address or which entity the input content should be sent to; and
   outputting the first communication address or its representation for use as a suggestion, or providing or displaying the first communication address or its representation to the user, wherein the representation includes a name or description of the first communication address or a name or description of the first entity.

2. The method of claim 1, further comprising:
   providing an option to send the input content to the first communication address either using the user's own identity or a proxy identity on behalf of the user.

3. The method of claim 1, further comprising:
   determining a relevance measure between the input content and the first communication address or the first entity based on the relation; when two or more communication addresses are displayed, ranking the two or more communication addresses or their representations based on the respective relevance measure.

4. The method of claim 1, wherein the second term is a term in a name or description associated with the first communication address, wherein the relation is identified by matching the first term with the second term.

5. The method of claim 1, wherein the second term is a term in a name or description associated with the first entity, wherein the relation is identified by matching the first term with the second term.

6. The method of claim 1, wherein the first term represents a first topic or domain and the second term represents a second topic or domain associated with the first entity, wherein the relation is identified by determining a relevance measure between the first topic or domain and the second topic or domain.

7. The method of claim 6, wherein the first term is not a name of the first entity.

8. The method of claim 6, wherein the input content does not contain a name of the first entity.

9. The method of claim 6, wherein the first term does not match the second term.

10. The method of claim 1, wherein the first communication address is in the form of a character string, and the second term is a sub-string of the first communication address, wherein the relation is identified by matching the first term with the second term.

11. A computer-implemented method for assisting communications, comprising:
    receiving an input content from a user, wherein the input content contains one or more terms each comprising a word or a phrase, wherein the input content is received without also receiving a recipient address from the user to send the input content to;
    identifying a first term in the input content;
    receiving a first communication address from a data source, wherein the first communication address is associated with a first entity, wherein the first entity includes a person or an organization, wherein the first communication address is selected from a collection of addresses previously used by the user;

identifying a second term associated with the first communication address;

identifying a relation between the first term and the first communication address based on the first term and the second term;

determining, based on the relation, the first communication address as a potential candidate for the user to send the input content to, wherein the user does not know at least one electronic communication address or at least one entity the input content should be sent to; and outputting the first communication address or its representation for use as a suggestion of a recipient to receive the input content, or providing or displaying the first communication address or its representation to the user, wherein the representation includes a name or description of the first communication address or a name or description of the first entity.

12. The method of claim 11, further comprising:

determining a relevance measure between the input content and the first communication address or the first entity based on the relation; when two or more communication addresses or entities are output or displayed, ranking the two or more communication addresses or entities based on the respective relevance measure.

13. The method of claim 11, wherein the first communication address is in the form of a character string, and the second term is a sub-string of the first communication address, wherein the relation is identified by matching the first term with the second term.

14. The method of claim 11, wherein the second term is a term in a name or description associated with the first communication address or the first entity, wherein the relation is identified by matching the first term with the second term.

15. The method of claim 14, further comprising:

identifying an element in a context of the first term, wherein the element indicates that the first term represents an recipient name associated with the first communication address, wherein the element comprises one or more terms or characters including punctuation marks surrounding the first term.

16. The method of claim 11, wherein the second term is a term that is pre-specified by a user to be associated with the first communication address, wherein the relation is identified by matching the first term with the second term.

17. The method of claim 11, wherein the first term is identified as a term representing a topic or topic category in the input content, wherein the second term is identified as a term indicating an interest or activity associated with the topic or topic category, wherein the first term does not match the second term.

18. The method of claim 11, further comprising:

selecting a communication tool and suggesting the communication tool to the user for sending the input content to the first communication address, wherein the communication tool is selected based on an association between the first communication address and the communication tool, wherein the communication tool comprises at least an email composing tool, a chat tool, or a sharing tool;

suggesting or providing the communication tool to the user.

* * * * *